United States Patent
Sankaran

(10) Patent No.: US 10,706,390 B2
(45) Date of Patent: Jul. 7, 2020

(54) METHOD AND APPARATUS FOR CHANGING ELECTRONIC DEVICE STATUS

(71) Applicant: Motorola Mobility LLC, Chicago, IL (US)

(72) Inventor: Esakkiappan Sankaran, Sunnyvale, CA (US)

(73) Assignee: Motorola Mobility LLC, Chicago, IL (US)

( * ) Notice: Subject to any disclaimer, the term of this patent is extended or adjusted under 35 U.S.C. 154(b) by 1147 days.

(21) Appl. No.: 14/884,790

(22) Filed: Oct. 16, 2015

(65) Prior Publication Data
US 2017/0109706 A1 Apr. 20, 2017

(51) Int. Cl.
*G06Q 10/00* (2012.01)
*G06Q 10/10* (2012.01)
*H04W 4/02* (2018.01)

(52) U.S. Cl.
CPC ........ *G06Q 10/1095* (2013.01); *H04W 4/027* (2013.01)

(58) Field of Classification Search
CPC .. G06Q 10/10; G06Q 10/109; G06Q 10/1093; G06Q 10/1095; H04W 4/029; H04W 4/027
See application file for complete search history.

(56) References Cited

U.S. PATENT DOCUMENTS

| | | | |
|---|---|---|---|
| 8,352,296 B2 | 1/2013 | Taneja et al. | |
| 2003/0065790 A1* | 4/2003 | Loveland | H04Q 3/0062 709/228 |
| 2007/0226034 A1* | 9/2007 | Khan | G06Q 10/109 705/7.19 |
| 2007/0264974 A1* | 11/2007 | Frank | H04L 63/0407 455/411 |
| 2011/0300875 A1* | 12/2011 | Kim | G01S 19/16 455/456.1 |
| 2014/0187200 A1* | 7/2014 | Reitter | H04W 12/08 455/410 |

(Continued)

OTHER PUBLICATIONS

Ghai, Sunil Kumar, et al. "Occupancy Detection in Commercial Buildings Using Opportunistic Context Sources." 2012 IEEE International Conference on Pervasive Computing and Communications Workshops, 2012. (Year: 2012).*

*Primary Examiner* — William S Brockington, III
(74) *Attorney, Agent, or Firm* — Yudell Isidore PLLC

(57) ABSTRACT

A method includes: obtaining schedule information from an online calendar for a user; monitoring for user movement at a predetermined time proximate to a scheduled event in the calendar; after detecting user movement, determining whether user location is consistent with a location associated with the scheduled event; if user location is consistent with scheduled event location, changing the electronic device status based on the scheduled event. An apparatus includes: a sensor configured to monitor and detect user movement; a processor coupled to the sensor and adapted to execute one or more processes; a Bluetooth Low Energy (BLE) module configured to operate in peripheral mode; a memory configured to store a meeting mode module executable by the processor, the meeting mode module when executed operable to: perform the above method.

18 Claims, 6 Drawing Sheets

(56) References Cited

U.S. PATENT DOCUMENTS

| | | | |
|---|---|---|---|
| 2014/0275850 A1* | 9/2014 | Venkatraman | A61B 5/0002 |
| | | | 600/301 |
| 2014/0330904 A1* | 11/2014 | Jackson | H04L 67/18 |
| | | | 709/204 |
| 2015/0110259 A1* | 4/2015 | Kaye | H04W 4/80 |
| | | | 379/202.01 |
| 2015/0356501 A1* | 12/2015 | Gorjestani | H04W 4/029 |
| | | | 705/333 |
| 2018/0032997 A1* | 2/2018 | Gordon | G06Q 20/3224 |

* cited by examiner

METHOD AND APPARATUS FOR CHANGING ELECTRONIC DEVICE STATUS

FIELD

The disclosure relates generally to the field of mobile device settings, and more specifically to mobile device settings based on user calendar information and location information.

BACKGROUND

Generally, mobile phone users desire to set their phone's ring tone to a less disturbing mode (e.g., off/silent/vibrate) when the user is busy (e.g., in a meeting) and regular ringing when the user is free. Consequently, there have been methods developed to automatically reconfigure a mobile phone when a user is expected to be busy, e.g. automatically switch to a "meeting mode". However, current methods do not actually determine if a user is busy. This often results in a user's phone being placed in meeting mode or a regular mode at the wrong times, e.g., if a user does not attend a meeting, the user is late for the meeting, the meeting has an earlier starting time, etc. The present disclosure provides systems and methods of reconfiguring a mobile phone based on verified user location and/or actual meeting attendance.

SUMMARY

There are provided herein methods and apparatus for automatically configuring an electronic device to enter and exit a meeting mode based on actual meeting attendance. Meeting attendance may be determined by obtaining a user's calendar information and location information and comparing them to determine whether a user is at a location consistent with the meeting location.

In a first aspect, a method is disclosed. The method includes: obtaining schedule information from an online calendar for a user; monitoring for user movement at a predetermined time proximate to a scheduled event in the calendar; after detecting user movement, determining whether user location is consistent with a location associated with the scheduled event; if user location is consistent with scheduled event location, changing the electronic device status based on the scheduled event.

In a second aspect, an apparatus is disclosed. The apparatus includes: a sensor configured to monitor and detect user movement; a processor coupled to the sensor and adapted to execute one or more processes; a Bluetooth Low Energy (BLE) module configured to operate in peripheral mode; a memory configured to store a meeting mode module executable by the processor, the meeting mode module when executed operable to: obtain schedule information from an online calendar for a user, obtain user movement data from the sensor at a predetermined time proximate to a scheduled event in the calendar, determine whether user location is consistent with a location associated with the scheduled event; and if user location is consistent with scheduled event location, change the electronic device status based on the scheduled event.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

Online calendars, such as, e.g., the Microsoft® Exchange (or Outlook) Calendar program, the iCal (or iCalendar) calendar program available from Apple Inc.®, or the Google Calendar available from Google®, are generally known and understood by those skilled in the art. As used herein, the term "online calendar" simply refers to a software-based calendar program that may be accessible through a computer network. Online calendars may be used to track events and appointments (e.g., meetings, etc.) for a calendar user in order to identify conflicts and free time.

Figure 1:
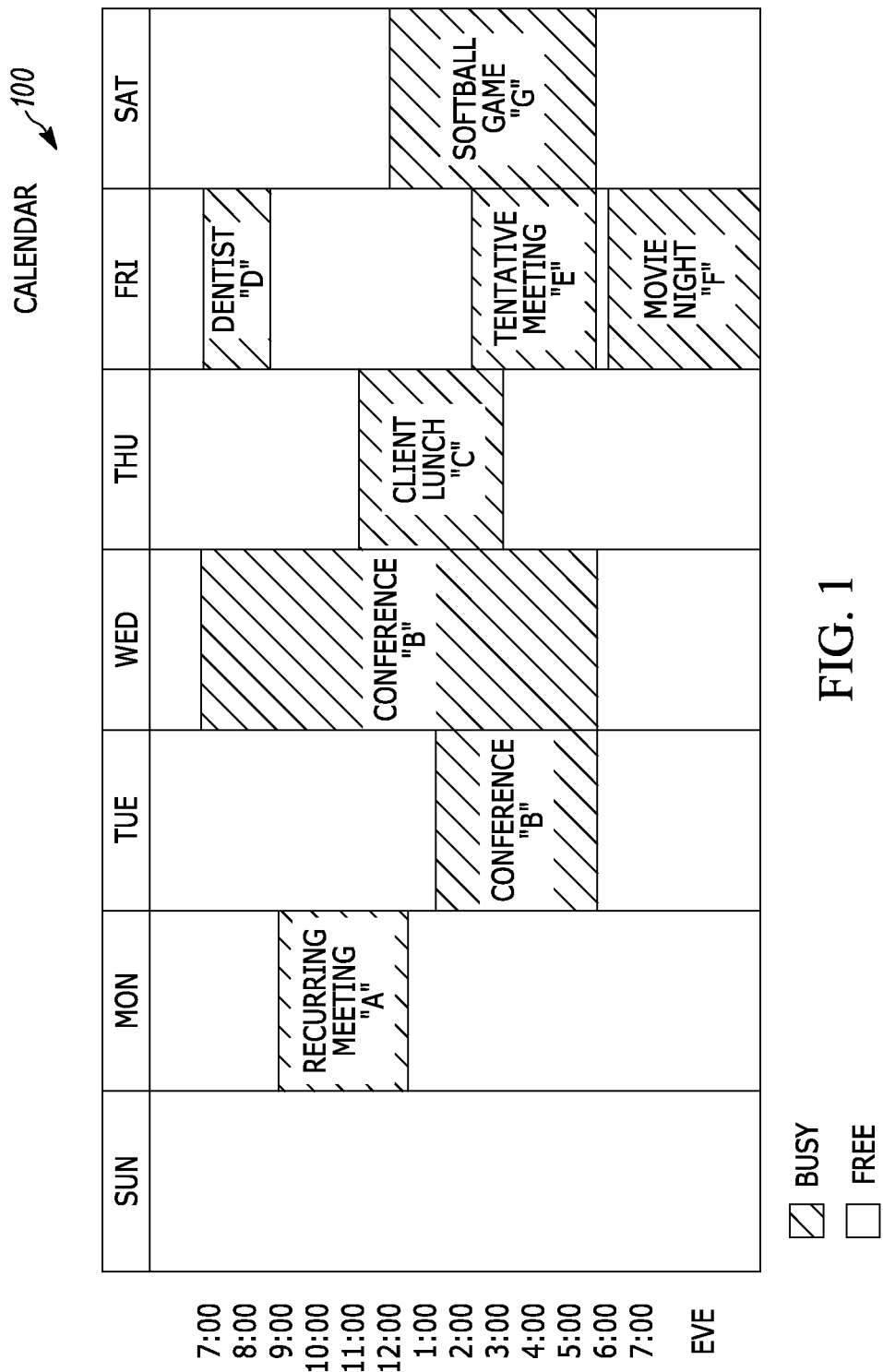
FIG. 1 illustrates an example online calendar in accordance with an embodiment of the disclosure.

FIG. 1 illustrates an example online calendar view 100. For instance, in a weekly view, days from Sunday through Saturday are shown, being illustratively divided into hourly time slots, shown from 7:00 AM to 7:00 PM. Various scheduled times or "busy" times (events, appointments, etc.) are shown, generally denoted as "A-G," while any time not otherwise indicated as such is referred to as "free" time. In addition to being visually useful for keeping track of events, online calendars may provide event reminders through on screen pop-up messages, email, SMS ("text") messages, pagers, etc. Also, online calendars may be shared with other calendar users to allow those other users to view a particular user's calendar, and to thus allow more efficient scheduling.

Online calendars may be accessible through a computer network, such as the Internet, so the calendars can be shared and synchronized ("synced") with other devices, such as personal computers (PCs), laptops, mobile/cellular phones, smart phones, smart devices, personal digital assistants (PDAs). For example, the devices may have software applications that access the calendar's management database (e.g., a Microsoft Exchange Server®, etc.) through a computer (or communication) network, such as through the Internet or mobile phone communication network.

Generally, a computer/communications network is a geographically distributed collection of nodes interconnected by communication links and segments for transporting data or signals between end nodes, such as PCs, phones, etc. The Internet is an example of a network that connects disparate networks throughout the world, providing global communication between nodes on various networks. The nodes in a computer network may by exchanging discrete frames or packets of data according to predefined protocols, such as the Transmission Control Protocol/Internet Protocol (TCP/IP). Alternatively or in addition, other communication protocols, such as common carrier telephone lines (POTS), mobile phone communications (e.g., cellular, satellite), etc., may be used to interconnect the devices on the network.

Figure 2:
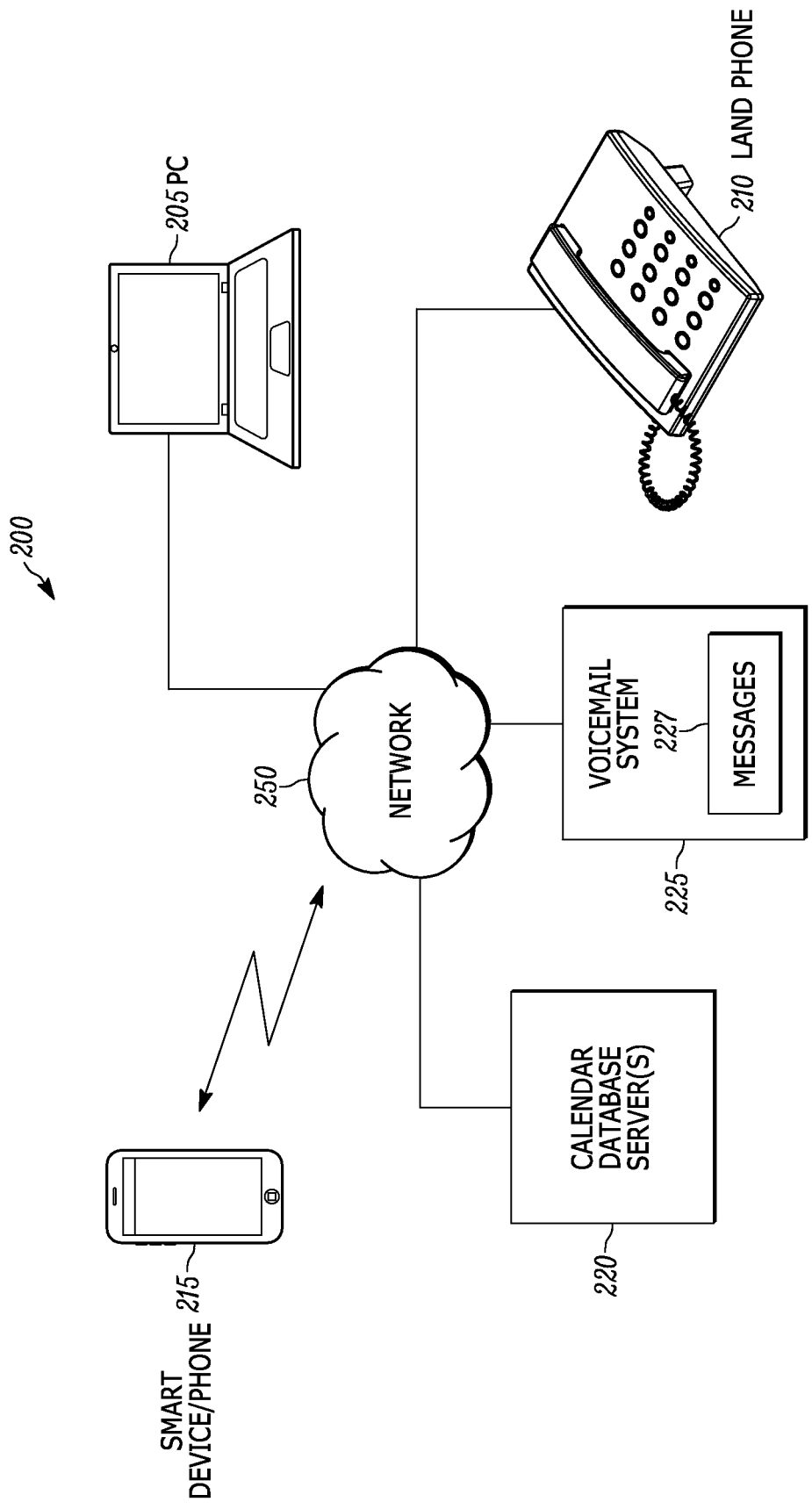
FIG. 2 illustrates an example computer/communications system in accordance with an embodiment of the disclosure.

FIG. 2 illustrates an example computer/communications system 200 including nodes/devices, such as one or more PCs 205, land-line or desktop phones 210 (e.g., IP phones), and smart devices/phones 215 (e.g., mobile phones), interconnected by the network cloud 250 as shown. Illustratively, a calendar database server 220 may also be interconnected with the network 250, as well as a voicemail system 225 (as described below). It should be appreciated that any number of nodes, devices, links, etc. may be used in the computer network.

The devices in the system 200 may each communicate with the calendar database server 220 to sync a user's calendar between devices (e.g., pulling information used to fill in the calendar 100.) That is, a user may alter the contents of the calendar from one device (e.g., PC 205), and may wish to access the calendar from another device (e.g., phone 215), so the server 220 may store and distribute the contents accordingly. Calendars may also be stored on a particular device, and that syncing a calendar may occur between devices without an intermediary server. Alternatively, a calendar may be simply stored on device itself, without needing an interconnection with a computer network (e.g., a PDA calendar without Internet connectivity).

Also shown in FIG. 2 is a voicemail system 225 and message storage 227. Voicemail system 225 may control the settings for voicemail, including number of rings before sending a caller to voicemail, what outgoing message to present to a caller, etc. Message storage 227 may include stored messages from callers along with metadata associated with the caller or message.

Figure 3:
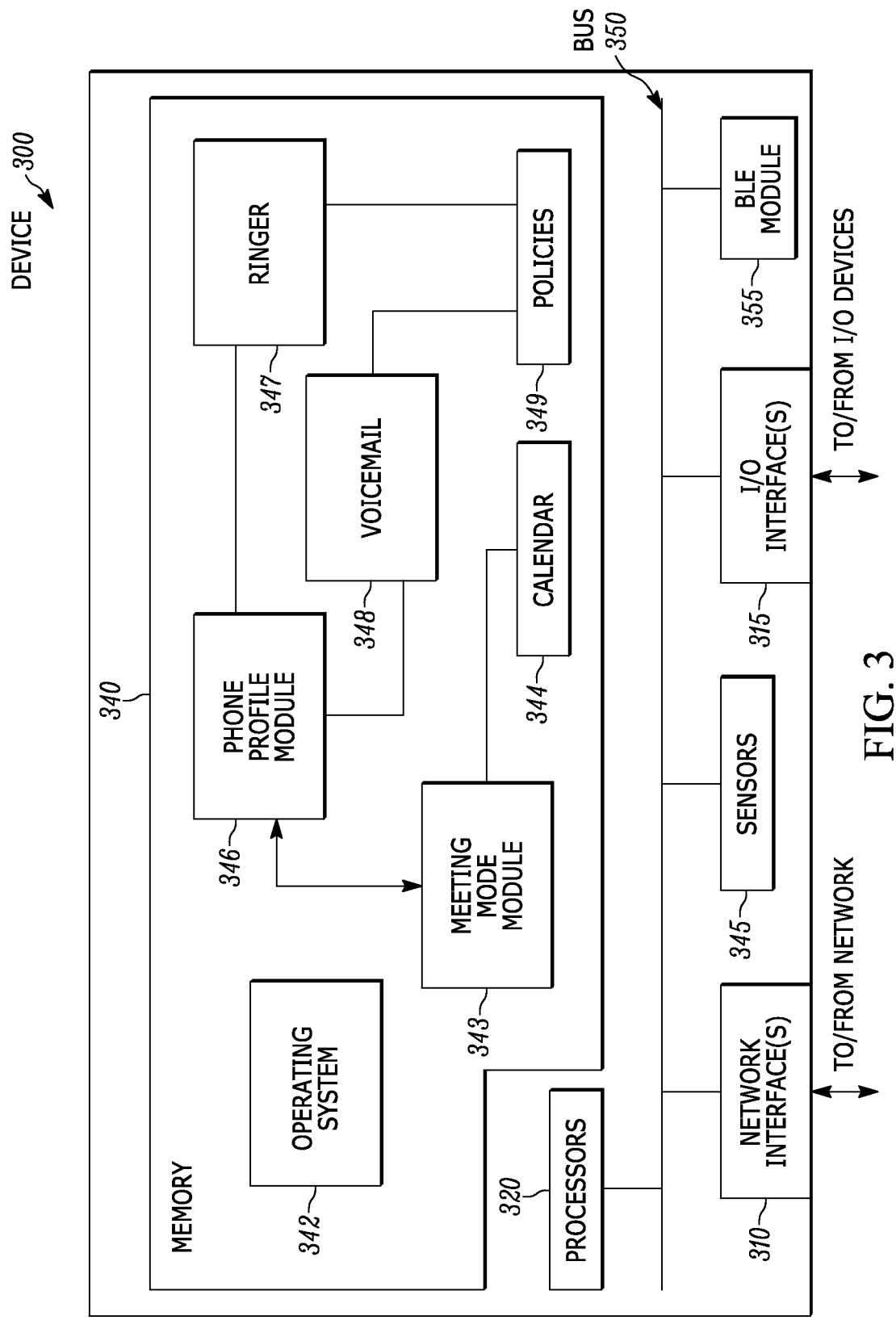
FIG. 3 illustrates an example mobile device in accordance with an embodiment of the disclosure.

FIG. 3 illustrates an example mobile device 300 that may be used with one or more embodiments described herein, e.g., a PC 205, phone 210, phone/device 215, or, in certain embodiments, voicemail system 225 (or calendar database server 220). The device 300 may include at least one network interface 310, input/output (I/O) interfaces 315, sensors 345, one or more processors 320, a memory 340, and a Bluetooth low energy (BLE) module 355 interconnected by a system bus 350. The network interface(s) 310 include the mechanical, electrical, and signaling circuitry for communicating data over physical links coupled to the network 350. Sensors 345 include an accelerometer, global positioning satellite (GPS), etc. The accelerometer is configured to detect movement of the device and the GPS is configured to detect movement and location of the device. BLE module 355 is configured to communicate with a variety of other electronic devices according to Bluetooth standards. BLE module 355 may be an integrated component with e.g., Bluetooth radio, microcontroller unit, software stack and communication profiles. In some embodiments, it is designed for short range communication using reduced power consumption. One capability of the BLE module 355 is that it can be set to peripheral mode in which the device can advertise small packets of data at periodic intervals. The network interfaces may be configured to transmit and/or receive data using a variety of different communication protocols, including, inter alia, TCP/IP, wireless protocols, mobile/cellular protocols, satellite protocols, etc. Also, I/O interfaces 315 contain the mechanical, electrical, and signaling circuitry for communicating with one or more I/O devices, such as a keyboard, mouse, stylus, touch-screens, displays, monitors, speakers, etc. (not shown).

The memory 340 includes a plurality of storage locations that are addressable by the processor(s) 320 for storing software programs and data structures associated with the embodiments described herein. The processor 320 may include necessary elements or logic adapted to execute the software programs and manipulate the data structures, such as, in certain embodiments, a calendar 344 and policies 349. An operating system 342 (e.g., various versions of Mac OS, Windows, Linux, BSD, Solaris, Android, proprietary operating systems, etc.), portions of which are typically resident in memory 340 and executed by the processor(s), functionally organizes the device by, inter alia, invoking operations in support of software processes and/or services executing on the device. These software processes and/or services may include a meeting mode module 343 and a phone profile module 346 as described herein, in addition to other device specific processes/programs (e.g., communication processes, etc.). It will be apparent to those skilled in the art that other types of processors and memory, including various computer-readable media, may be used to store and execute program instructions pertaining to the inventive technique described herein. Additionally, while meeting mode module 343 and phone profile module 346 are shown as separate modules, they may be integral with each other as a single module.

As noted above, device users should set their device's volume, such as system sounds, or illustratively, a phone's ring tone, to a less disturbing mode (e.g., off/silent/vibrate) when the user is busy (e.g., in a meeting) and regular ringing when the user is free. If the user forgets, their phone may ring at an inopportune time (e.g., in an important meeting). Currently, certain phones/devices have the ability to switch phone profiles based on predetermined time of day. For instance, one or more cell phone manufacturers provide functionality that change the profile based on time, such as setting a ring tone to "vibrate" at 9:00 AM and back to "normal" at 5:00 PM (where the user can select these two times). Alternatively, a user may change his phone to "meeting mode" prior to entering a meeting or have the phone enter a "meeting mode" based on the user's calendar. The first of these scenarios relies upon a user to manually change the phone setting, which of course, is not ideal for the reasons named above. The second scenario is not dynamic, and may not accurately reflect the state of the user during the day (e.g., he may not attend a meeting, the meeting time may change, etc.).

According to one or more embodiments described herein, a phone profile of the particular user may be set to meeting mode based on the current availability status of a user's corresponding online calendar (also referred to as a "free/busy" status in the art of online calendars) and verified user location (e.g., actual meeting attendance).

Illustratively, the techniques described herein may be performed by hardware, software, and/or firmware, such as in accordance with meeting mode module 343 or phone profile module 346, which may contain computer executable instructions executed by the processor 320 to perform functions relating to the novel techniques described herein. In addition, meeting mode module 343 or phone profile module 346 may operate in conjunction with calendar 344 and sensors 345 operating in a conventional manner and/or in a manner as described herein, and which also may contain computer executable instructions executed by the processor 320 to perform corresponding functions.

Figure 4:
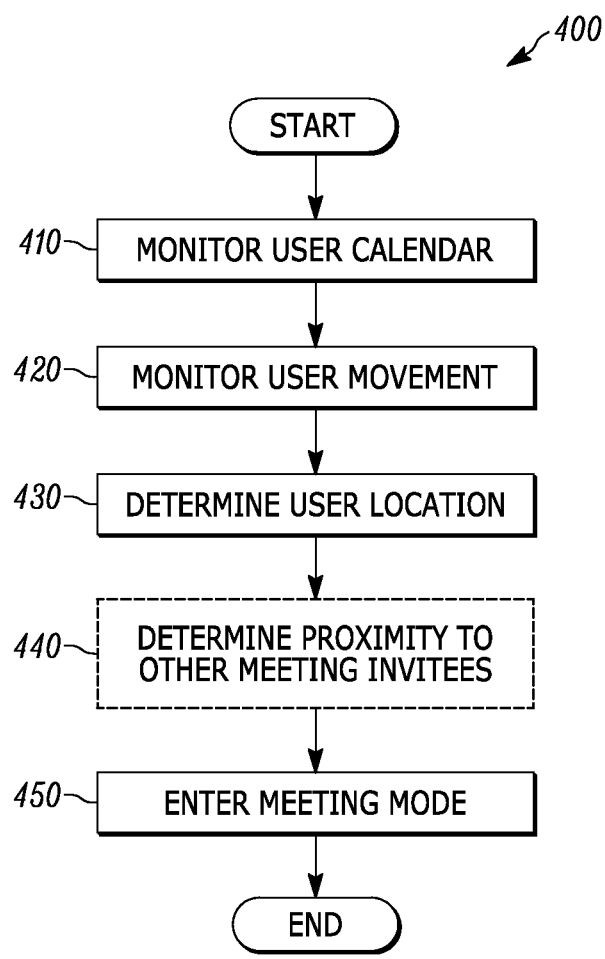
FIG. 4 illustrates an example overview for entering a meeting mode for an electronic device in accordance with an embodiment of the disclosure.

FIG. 4 illustrates an example overview process 400 for entering a meeting mode for an electronic device in accordance with an embodiment of the disclosure. Process 400 begins with operation 410, where the user's online calendar is monitored for any upcoming scheduled events, such as meetings, conferences, lunches, and personal appointments.

In some embodiments, the calendar is monitored by obtaining the schedule information from a user's online calendar at predetermined times, such as daily, every few hours, etc.

At operation 420, a user's movement is monitored to determine whether or not a user (e.g., via the device) is on his way to a scheduled event. As used herein, user movement may include walking, running, being still, etc. The user movement may be monitored by analyzing accelerometer data to detect movement of the device beyond a predetermined threshold, where the threshold greater than placing the device on a desk or putting in a pocket. For example, a classifier that is configured to extract user activities based on a knowledge of known data patterns may be used to detect movement of the device beyond or exceeding a threshold. In general, the monitoring for user movement is performed at a predetermined time proximate to the scheduled event, such as 5 to 10 minutes before the scheduled event.

At operation 430, the user's location is determined. The user location may be determined by using GPS data from the device or coarse-grained location data, e.g. using Wi-Fi. Alternatively GPS or movement data from another smart device, such as a smart watch or fitness tracker, may communicate with the electronic device to provide location information about the user. Once the location of the user is determined, it is compared to the location associated with the scheduled event in the online calendar.

At optional operation 440, the proximity to other scheduled event invitees is determined. In some embodiments, this proximity to other invitees is obtained via Bluetooth notifications or messages. For example, a Bluetooth low energy module on electronic devices may broadcast device identification and scheduled event identification, as will be discussed in further detail with respect to FIG. 5.

If the user location is consistent with the location associated with the scheduled event, at operation 450, the device enters into meeting mode. The meeting mode module 343 may communicate with or direct phone profile module 346 to follow policy rules or policies for meeting mode. Meeting mode is herein defined as as setting up a phone profile in which the phone is not interrupting while the user is busy attending a scheduled meeting. For example, the phone's volume setting may be set to silent or vibrate so that incoming calls and messages are not interrupting the user. Additional phone settings, for example, sending a pre-configured response message for incoming calls to the caller device to notify that the user is busy at a meeting may be implemented. Exceptions could also be set so that the phone behaves normally for an individual incoming call or message that is determined to be important. In some embodiments, the phone profile module 346 displays a visual status indicator in the primary user interface display unit so that the user knows when the phone is placed in meeting mode.

Figure 5:
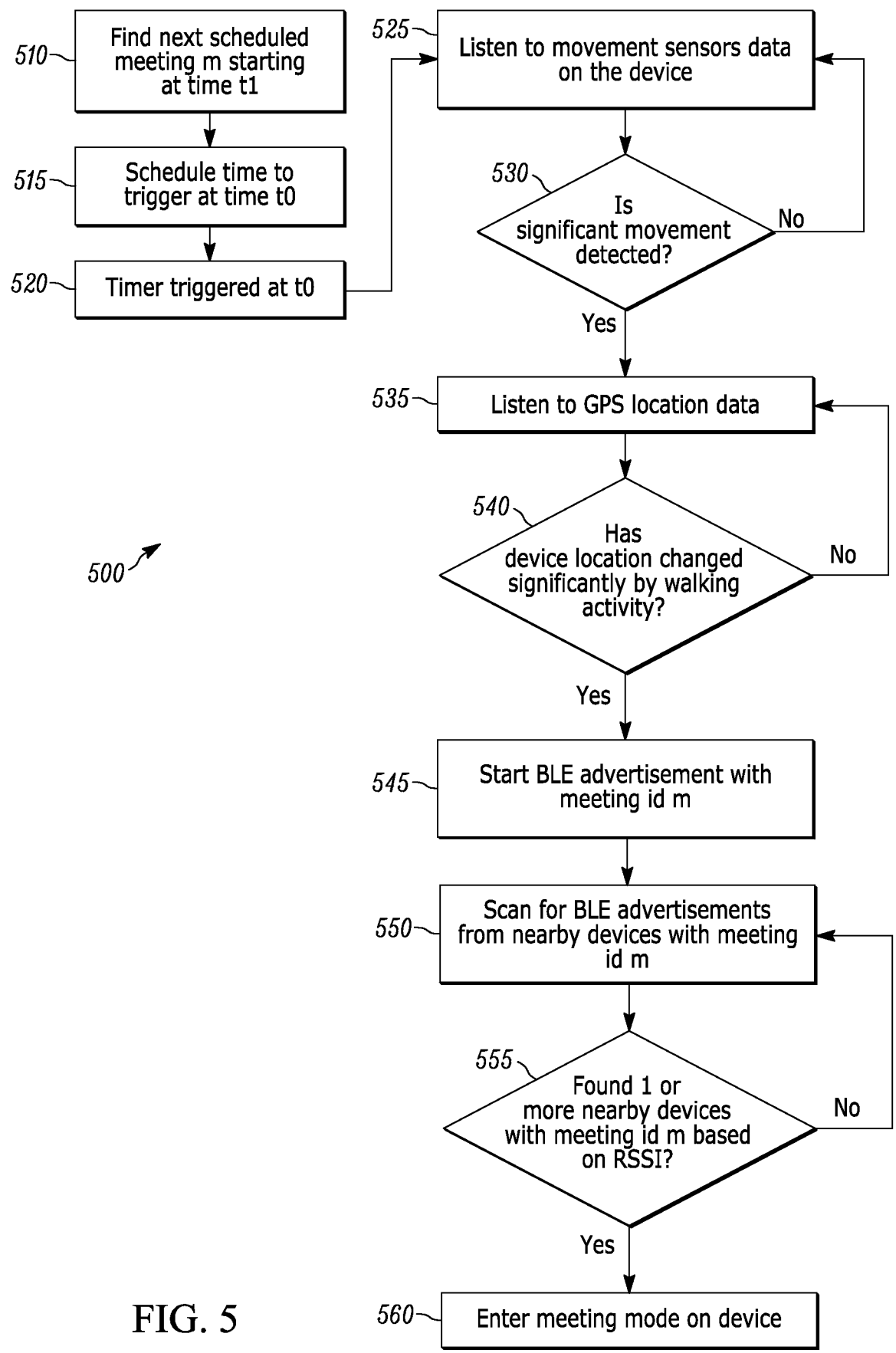
FIG. 5 illustrates an example procedure for entering a meeting mode for an electronic device in accordance with an embodiment of the disclosure.

FIG. 5 illustrates an example process 500 for entering a meeting mode for an electronic device in accordance with an embodiment of the disclosure. Process 500 may be implemented, for example, using calendar 344, meeting mode module 343, sensors 345, and a Bluetooth low energy (BLE) module (not shown).

Process 500 begins with operation 510, where the next scheduled meeting m starting at time t1 is obtained from calendar 344. The meeting mode module 343 may obtain the meeting time and at operation 515, schedule a time t0 for which to begin monitoring the user's device. Time t0 is before meeting time t1, typically 5 to 10 minutes, but can be set to any desired time. As shown, at operation 520, the time t0 is triggered.

At operation 525, meeting mode module 343 may retrieve movement sensor data on the device. For example, any movement detected by accelerometer or GPS sensors may be used. At operation 530, it is determined if significant movement is detected. If not, device returns to operation 525 until movement is detected.

If significant movement is detected, meeting mode module 353 obtains location data at operation 535. As described above, significant movement entails the device moving a greater amount than be placed on a desk or in the user's pocket and includes, for example, walking, running, etc. As shown, operation 535 has the meeting mode module 343 listening to GPS location data. However, any location data may be used.

At operation 540, meeting mode module 343 determines if the device location has changed significantly by walking activity. If not, device returns to operation 535 until significant walking activity is detected.

If significant walking activity is detected, at operation 545 a BLE module on the device is enabled or activated and the device begins broadcasting an advertisement with meeting identification m. In some embodiments, the broadcast includes the device identification d as well as meeting identification m. As used herein, meeting identification m includes the identification for a scheduled event, whether it is a meeting, conference, an appointment, etc. In some embodiments, the broadcast includes additional information about the device, for example, the device's movement activity (e.g. user's walking activity).

In some embodiments, the user's movement activity is sent to other devices associated with meeting identification m. For example, using BLE or other communications mediums (such as Wi-Fi or via a cellular network), the device may send its information, e.g., to a cloud server, for at least one other device associated with meeting identification m to retrieve. Devices associated with meeting identification m include the meeting organizer, a meeting invitee, a user's supervisor or assistant (e.g., someone with access to the user device's calendar), etc.

At operation 550, the device scans for BLE advertisements with meeting identification m on nearby or proximate devices. At operation 555, it is determined if one or more devices with a meeting id m have a received signal strength indication (RSSI) above a predefined threshold value. As is known, BLE advertisement packets include a reference transmission power (calibrated RSSI) that indicates the strength of the signal at a known distance e.g., 1 meter. The actual strength of the BLE signal is the received RSSI. Using the values of calibrated RSSI and the received RSSI, an estimation of distance with the proximate devices can be determined in meters. For example, devices within a 10-meter radius can be considered for a small meeting room. If no devices having an RSSI above the predefined threshold value are found, the device returns to operation 550 until at least one is found.

If at least one nearby device having an RSSI above the predefined threshold value is found, at operation 560 the device enters into meeting mode. As provided above, the meeting mode module 343 may communicate with or direct phone profile module to 346 to follow policy rules or policies for meeting mode. Such policies may be stored in and implemented by policies 349.

Once in meeting mode, the device will remain in meeting mode for the expected duration of the meeting (as provided in the calendar) or until the device determines that it should exit meeting mode. For example, the device may be triggered to reassess if meeting mode is correct based on significant user movement being detected while in meeting mode. Alternatively, the device may reassess meeting mode based on the projected meeting time ending, such as provided in FIG. 6.

Figure 6:
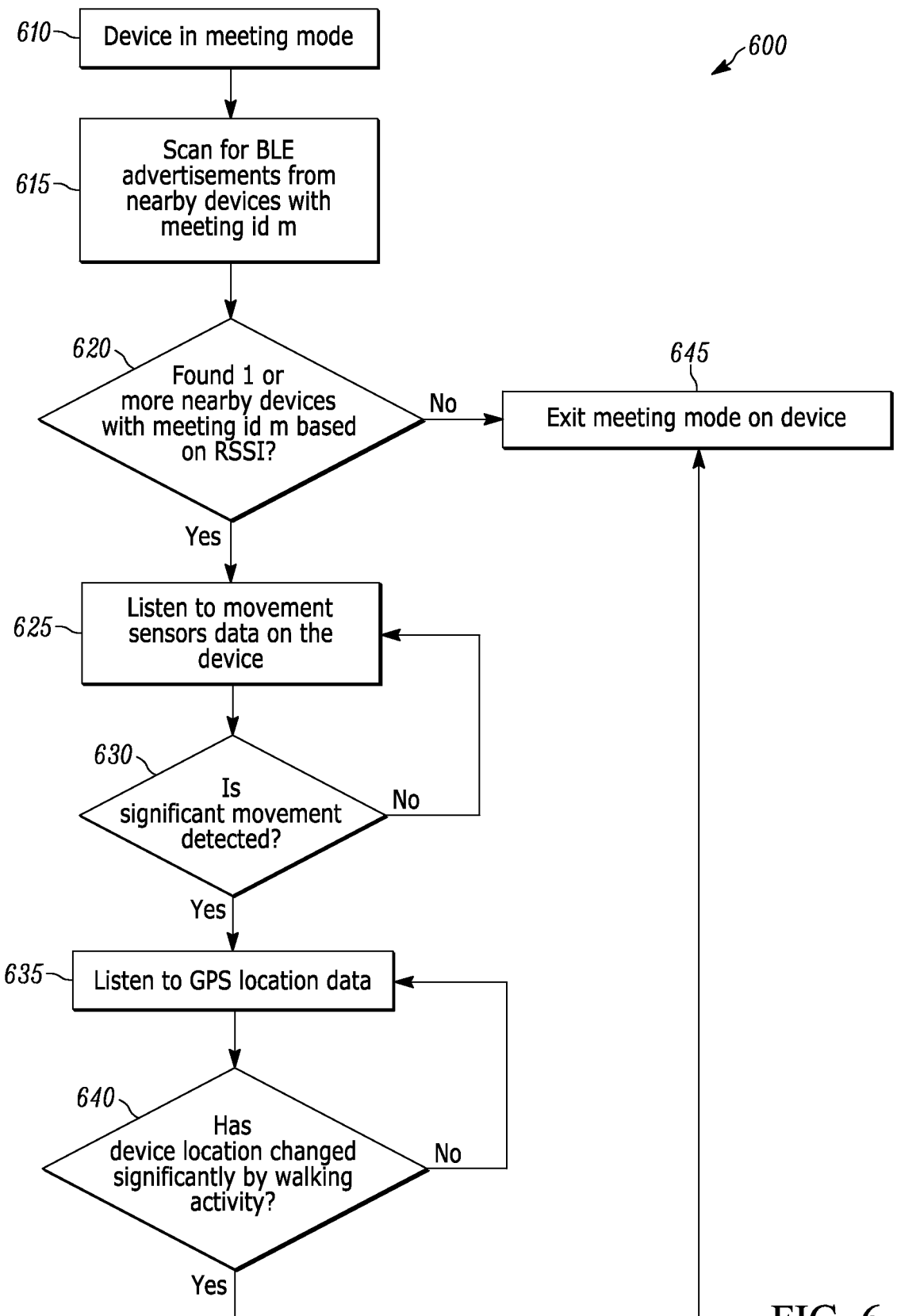
FIG. 6 illustrates an example procedure for exiting a meeting mode for an electronic device in accordance with an embodiment of the disclosure.

FIG. 6 illustrates an example procedure 600 for exiting a meeting mode for an electronic device in accordance with an embodiment of the disclosure. Process 600 begins with operation 610, where the device is in meeting mode. In some embodiments, process 600 is initiated at a time prior to the projected meeting ending time, such as 5 to 10 minute before the meeting has been scheduled to end. In other embodiments, time triggers that are likely to end a meeting before the scheduled meeting end time, such as 12 pm for a lunch break or 5 pm for the end of a work day may alternatively or additionally be used.

At operation 615, the device scans for BLE advertisements with meeting identification m on nearby or proximate devices. For example, devices within a 10-meter radius from the scanning device may be scanned.

At operation 610, it is determined if one or more devices with a meeting id m have a received signal strength indication (RSSI) above a predefined threshold value. If no devices having an RSSI above the predefined threshold value are found, the device exits the meeting mode on the device at operation 645.

If at least one nearby device having an RSSI above the predefined threshold value is found, at operation 625 meeting mode module 343 may retrieve or listen to movement sensor data on the device. For example, any movement detected by accelerometer or GPS sensors may be used. At operation 630, it is determined if significant movement is detected. If not, device returns to operation 625 until movement is detected.

If significant movement is detected, meeting mode module 353 obtains location data at operation 635. As described above, significant movement entails the device moving a greater amount than be placed on a desk or in the user's pocket and includes, for example, walking, running, etc. As shown, operation 635 has the meeting mode module 343 listening to GPS location data. However, any location data may be used.

At operation 640, meeting mode module 343 determines if the device location has changed significantly by walking activity. If not, device returns to operation 635 until significant walking activity is detected.

If significant walking activity is detected, at operation 645 the device exits the meeting mode.

As used in this application, the terms "component," "module," "unit," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although described specifically throughout the entirety of the instant disclosure, representative embodiments have utility over a wide range of applications, and the above discussion is not intended and should not be construed to be limiting, but is offered as an illustrative discussion of aspects of the disclosure. What has been described and illustrated herein are embodiments of the disclosure along with some of their variations. The terms, descriptions and figures used herein are set forth by way of illustration only and are not meant as limitations. Those skilled in the art will recognize that many variations are possible within the spirit and scope of the disclosure, wherein the disclosure is intended to be defined by the following claims—and their equivalents—in which all terms are mean in their broadest reasonable sense unless otherwise indicated.

What is claimed is:

1. A method comprising:
obtaining, at an electronic device, schedule information from an online calendar, the schedule information corresponding to a user of the electronic device;
monitoring for user movement by detecting movement of the electronic device exceeding a predetermined threshold at a predetermined time proximate to a scheduled event in the online calendar;
in response to detecting movement of the electronic device beyond the predetermined threshold, identifying a user location and determining whether the user location is consistent with a location associated with the scheduled event in the online calendar; and
in response to the user location being consistent with the scheduled event location:
changing a status of the electronic device based on the scheduled event, wherein the electronic device status is changed to place the electronic device in a meeting mode of operation in response to the scheduled event being a meeting;
monitoring for nearby electronic devices with a scheduled event identification message consistent with the scheduled event from the online calendar;
determining when one or more nearby electronic devices with the scheduled event identification message has a received signal strength indication (RSSI) above a predefined threshold value; and
in response to determining that the one or more nearby electronic devices with the scheduled event identification message do not have the RSSI above the predefined threshold value, exiting the meeting mode on the electronic device.

2. The method of claim 1, wherein:
monitoring the user movement comprises analyzing sensor data, the sensor data comprising at least one of accelerometer data, global positioning satellite (GPS) data, and coarse-grained location data; and
the method-further comprising:
detecting walking activity by the user;
determining if the device location has changed by the walking activity of the user; and in response to detecting the walking activity by the user, activating a Bluetooth Low Energy (BLE) module on the electronic device to broadcast an advertisement with meeting identification.

3. The method of claim 1, further comprising:
enabling a Bluetooth module configured to transmit a device identification and the scheduled event identification message to a second electronic device associated with the scheduled event;
wherein the second electronic device associated with the scheduled event comprises an event organizer or another scheduled event invitee; and
wherein the Bluetooth module is also configured to transmit the user movement to the second electronic device associated with the scheduled event.

4. The method of claim 1, wherein the predetermined time proximate to the scheduled event comprises a predetermined time prior to the scheduled event.

5. The method of claim 1, further comprising:
monitoring for nearby electronic devices with the scheduled event identification message consistent with the scheduled event from the user calendar, the monitoring comprising scanning, by the electronic device, for BLE advertisements with a meeting identification on at least one second device;
determining when the at least one second device with the meeting identification has an associated received signal strength indication (RSSI) above the predefined threshold value; and
in response to determining that the at least one second device has an associated RSSI above the predefined threshold value, triggering the electronic device to enter into the meeting mode of operation.

6. The method of claim 5, wherein determining when the least one second device has the associated RSSI above the predefined threshold comprises:
retrieving a calibrated RSSI from a received BLE advertisement packet from the at least one second device, the calibrated RSSI indicating a strength of a corresponding signal at a known distance;
estimating a distance between the electronic device and the at least one second device using values of the calibrated RSSI and the RSSI; and
identifying the electronic device and the at least one second device within a given radius of each other as being considered in a meeting space.

7. The method of claim 1, wherein:
monitoring the user movement comprises analyzing accelerometer data; and
in response to the accelerometer data indicating the user movement exceeds the predetermined threshold, the method comprises enabling a GPS sensor on the electronic device to detect the user location relative to the location of the scheduled event.

8. The method of claim 1, further comprising:
in response to determining that the one or more nearby electronic devices have the RSSI above the predefined threshold value, maintaining the electronic device in the meeting mode and retrieving movement sensor data to determine if movement beyond the predetermined threshold is detected.

9. The method of claim 1, wherein determining the user location comprises receiving, at the electronic device, a communication of GPS or movement data from another user device to provide location information about the user.

10. The method of claim 9, wherein receiving the communication comprises receiving the communication from one of a smart watch and a fitness tracker.

11. The method of claim 1, wherein the electronic device is a phone communication device and changing the status of the electronic device comprises setting up a device profile in which the phone communication device does not interrupt the user while the user is attending a scheduled meeting, the setting up of the device profile comprising:
setting the phone communication device to send a preconfigured response message for incoming calls to a caller device to notify that the user is busy at the scheduled meeting; and
setting exceptions for the phone communication device to behave normally for individual incoming calls or messages that are determined to be important.

12. The method of claim 1, further comprising monitoring for time triggers that are likely to end the meeting before a scheduled meeting end time and initiating monitoring for user movement prior to the scheduled meeting end time based on the time triggers.

13. The method of claim 1, further comprising:
in response to the electronic device being at the location in which the scheduled event is occurring:
monitoring for subsequent user movement at a predetermined time proximate to an end of the scheduled event;
in response to detecting user movement within the predetermined time proximate to the end of the scheduled event:
determining whether a subsequent user location is consistent with the location associated with the scheduled event; and
in response to the subsequent user location not being consistent with the location of the scheduled event, changing the electronic device status based on the subsequent user location, wherein the electronic device exits the meeting mode.

14. The method of claim 1, wherein, in response to the scheduled event being a meeting:
displaying a visual status indicator in a user interface display unit of the electronic device to alert the user when the electronic device is placed in the meeting mode, wherein a device profile is set up in which the electronic device does not interrupt the user while the user is busy attending a scheduled meeting.

15. An apparatus comprising:
a sensor configured to monitor and detect user movement;
a processor coupled to the sensor and adapted to execute one or more processes;
a Bluetooth Low Energy (BLE) module configured to operate in peripheral mode; and
a memory configured to store a meeting mode module executable by the processor, the meeting mode module, when executed, operable to:
obtain schedule information from an online calendar, the schedule information corresponding to a user of the electronic device;
obtain user movement data from the sensor detecting movement of the electronic device exceeding a predetermined threshold at a predetermined time proximate to a scheduled event in the online calendar;
in response to detecting movement of the electronic device beyond the predetermined threshold, identifying a user location and determine whether the user location is consistent with a location associated with the scheduled event in the online calendar; and in response to the user location being consistent with the scheduled event location:
change a status of the electronic device based on the scheduled event, wherein the electronic device status is changed to place the electronic device in a meeting mode of operation in response to the scheduled event being a meeting;
monitor for nearby electronic devices with a scheduled event identification message consistent with the scheduled event from the online calendar;
determine when one or more nearby electronic devices with the scheduled event identification message has a received signal strength indication (RSSI) above a predefined threshold value; and
in response to determining that the one or more nearby electronic devices with the scheduled event identification message do not have the RSSI above the predefined threshold value, exiting the meeting mode on the electronic device.

16. The apparatus of claim 15, wherein the meeting mode module is further operable to:
in response to determining that the one or more nearby electronic devices have the RSSI above the predefined threshold value, maintain the electronic device in the meeting mode and retrieve movement sensor data to determine if movement beyond the predetermined threshold is detected;
monitor for subsequent user movement at a predetermined time proximate to an end of the scheduled event; and
in response to detecting user movement within the predetermined time proximate to the end of the scheduled event:
determine whether a subsequent user location is consistent with the location associated with the scheduled event; and
in response to the subsequent user location not being consistent with the location of the scheduled event, change the electronic device status based on the subsequent user location, wherein the electronic device exits the meeting mode.

17. A computer program product comprising:
a computer readable storage media; and
program code on the computer readable storage media that when executed by a processor of an electronic device configures the electronic device to perform the functions of:
obtaining, at the electronic device, schedule information from an online calendar, the schedule information corresponding to a user of the electronic device;
monitoring for user movement by detecting movement of the electronic device exceeding a predetermined threshold at a predetermined time proximate to a scheduled event in the online calendar;
in response to detecting movement of the electronic device beyond the predetermined threshold, identifying a user location and determining whether the user location is consistent with a location associated with the scheduled event in the online calendar; and
in response to determining the user location is consistent with the scheduled event location:
changing a status of the electronic device based on the scheduled event, wherein the electronic device status is changed to place the electronic device in a meeting mode of operation in response to the scheduled event being a meeting;
monitoring for nearby electronic devices with a scheduled event identification message consistent with the scheduled event from the online calendar;
determining when one or more nearby electronic devices with the scheduled event identification message has a received signal strength indication (RSSI) above a predefined threshold value; and
in response to determining that the one or more nearby electronic devices with the scheduled event identification message do not have the RSSI above the predefined threshold value, exiting the meeting mode on the electronic device.

18. The computer program product of claim 17, the program code further configuring the electronic device to perform the functions of:
in response to determining that the one or more nearby electronic devices have the RSSI above the predefined threshold value, maintaining the electronic device in the meeting mode and retrieving movement sensor data to determine if movement beyond the predetermined threshold is detected;
monitoring for subsequent user movement at a predetermined time proximate to an end of the scheduled event; and
in response to detecting user movement within the predetermined time proximate to the end of the scheduled event:
determining whether a subsequent user location is consistent with the location associated with the scheduled event; and
in response to the subsequent user location not being consistent with the location of the scheduled event, changing the electronic device status based on the subsequent user location, wherein the electronic device exits the meeting mode.

* * * * *